(12) United States Patent
Naito (10) Patent No.: US 8,944,325 B2
(45) Date of Patent: Feb. 3, 2015

(54) INFORMATION PROCESSING APPARATUS AND INFORMATION PROCESSING METHOD

(71) Applicant: Toshiba Tec Kabushiki Kaisha, Shinagawa-ku, Tokyo (JP)

(72) Inventor: Hidehiro Naito, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/968,565

(22) Filed: Aug. 16, 2013

(65) Prior Publication Data

US 2014/0063566 A1 Mar. 6, 2014

(30) Foreign Application Priority Data

Sep. 6, 2012 (JP) ................................. 2012-196344

(51) Int. Cl.
*G06K 15/00* (2006.01)
*G06F 17/00* (2006.01)
*G06K 19/00* (2006.01)
*H04N 1/203* (2006.01)

(52) U.S. Cl.
CPC ...................................... *H04N 1/203* (2013.01)
USPC . 235/383; 235/385; 235/462.01; 235/462.14; 235/462.15

(58) Field of Classification Search
CPC ............ G06K 7/10881; G06K 7/1095; G06K 7/1417; G06K 19/06046; G06K 7/10722; G06K 7/10712; G06K 7/10; G06K 7/14; G02B 26/10
USPC ................ 235/375, 383, 462.01–472.03, 385
See application file for complete search history.

(56) References Cited

U.S. PATENT DOCUMENTS

| 5,324,922 | A | * | 6/1994 | Roberts .......................... 235/375 |
| 7,575,168 | B2 | * | 8/2009 | Suomela et al. ......... 235/462.01 |
| 8,712,853 | B2 | | 4/2014 | Iizaka et al. |
| 2006/0071077 | A1 | * | 4/2006 | Suomela et al. ......... 235/462.01 |
| 2010/0176201 | A1 | * | 7/2010 | Ehrhart et al. ........... 235/462.11 |
| 2011/0024490 | A1 | * | 2/2011 | Kangas et al. ................. 235/375 |
| 2011/0284638 | A1 | * | 11/2011 | Ehrhart et al. ........... 235/462.11 |
| 2012/0048937 | A1 | * | 3/2012 | Dahari ..................... 235/462.08 |

FOREIGN PATENT DOCUMENTS

| JP | 06-187571 | 7/1994 |
| JP | 2011-221585 | 11/2011 |
| JP | 2012-022529 | 2/2012 |

OTHER PUBLICATIONS

Office Action of Notice of Rejection for Japanese Patent Application No. 2012-196344 Dated Aug. 18, 2014, 10 pgs.

* cited by examiner

*Primary Examiner* — Tuyen K Vo
(74) *Attorney, Agent, or Firm* — Amin, Turocy & Watson, LLP (57) ABSTRACT

In accordance with one embodiment, an information processing apparatus includes an acquirement unit configured to acquire a captured image obtained by capturing a commodity by an image capturing unit in sequence; a plurality of reading units configured to read the information relating to the commodity respectively from the captured image acquired by the acquirement unit; a control unit configured to enable each reading unit to act according to a specified order based on setting information in which the operation timing of the reading unit is set; and an output unit configured to output the information read by the reading unit.

7 Claims, 13 Drawing Sheets

| NO | LABEL FEATURE TABLE | SERVICE INFORMATION |
|---|---|---|
| 1 | 0.5, US$, OFF | - U S $ 0. 5 |
| 2 | 10, %, OFF | -10% |
| 3 | 10, POINT | +10P |
| ⋮ | ⋮ | ⋮ |

BAR CODE READING SECTION:     EACH DECODE START TIMING [n] FOR EVERY IMAGE INPUT [m]

TWO-DIMENSIONAL CODE READING SECTION:     EACH DECODE START TIMING [n] FOR EVERY IMAGE INPUT [m]

LABEL READING SECTION:     EACH DECODE START TIMING [n] FOR EVERY IMAGE INPUT [m]

FIG.9

| | 452 |
|---|---|
| BAR CODE READING SECTION: | EACH DECODE START TIMING [0]<br>FOR EVERY IMAGE INPUT [1] |
| TWO-DIMENSIONAL<br>CODE READING SECTION: | EACH DECODE START TIMING [0]<br>FOR EVERY IMAGE INPUT [1] |
| LABEL READING SECTION: | EACH DECODE START TIMING [0]<br>FOR EVERY IMAGE INPUT [1] |

BAR CODE READING SECTION:     EACH DECODE START TIMING [0]
                              FOR EVERY IMAGE INPUT [1]

TWO-DIMENSIONAL               EACH DECODE START TIMING [0]
CODE READING SECTION:         FOR EVERY IMAGE INPUT [2]

LABEL READING SECTION:        EACH DECODE START TIMING [1]
                              FOR EVERY IMAGE INPUT [2]

INFORMATION PROCESSING APPARATUS AND INFORMATION PROCESSING METHOD

CROSS-REFERENCE TO RELATED APPLICATION

This application is based upon and claims the benefit of priority from Japanese Patent Application No. 2012-196344, filed Sep. 6, 2012, the entire contents of which are incorporated herein by reference.

FIELD

Embodiments described herein relate to an information processing apparatus and an information processing method.

BACKGROUND

Conventionally, in a store such as a supermarket and the like, a commodity code reading apparatus is used to read a commodity code according to a code symbol such as a bar code, a two-dimensional code (for example, a QR code (a registered trademark)) and the like assigned to a commodity captured by a digital camera such as a CCD image sensor and the like. In addition, a technology for detecting a label attached to a commodity from a captured image and reading a service content such as a discount and the like represented by the label was proposed conventionally. However, in the conventional technology above, a reading timing is not particularly considered, and in a condition that the code symbol and the label are read in sequence, the reading cannot be efficiently carried out possibly.

DETAILED DESCRIPTION

In accordance with one embodiment, an information processing apparatus includes an acquirement unit, a plurality of reading units, a control unit and an output unit. The acquirement unit is configured to acquire a captured image obtained by capturing a commodity by an image capturing unit in sequence. The plurality of reading units are configured to read the information relating to the commodity respectively from the captured image acquired by the acquirement unit. The control unit is configured to enable each reading unit to operate in a specified order based on setting information in which the operation timing of the reading unit is set. The output unit is configured to output the information read by the reading unit.

Hereinafter, the embodiment of the information processing apparatus and a program is described in detail with reference to accompanying drawings. In addition, the embodiment described below is one embodiment of the information processing apparatus and the program, and are not intended to limit the configuration or the specification thereof. The present embodiment is an application example of a checkout system introduced into a store such as a supermarket and the like which comprises a POS terminal for carrying out the registration settlement of a commodity in one transaction, and a code reading apparatus for reading the information relating to a commodity.

Figure 1:
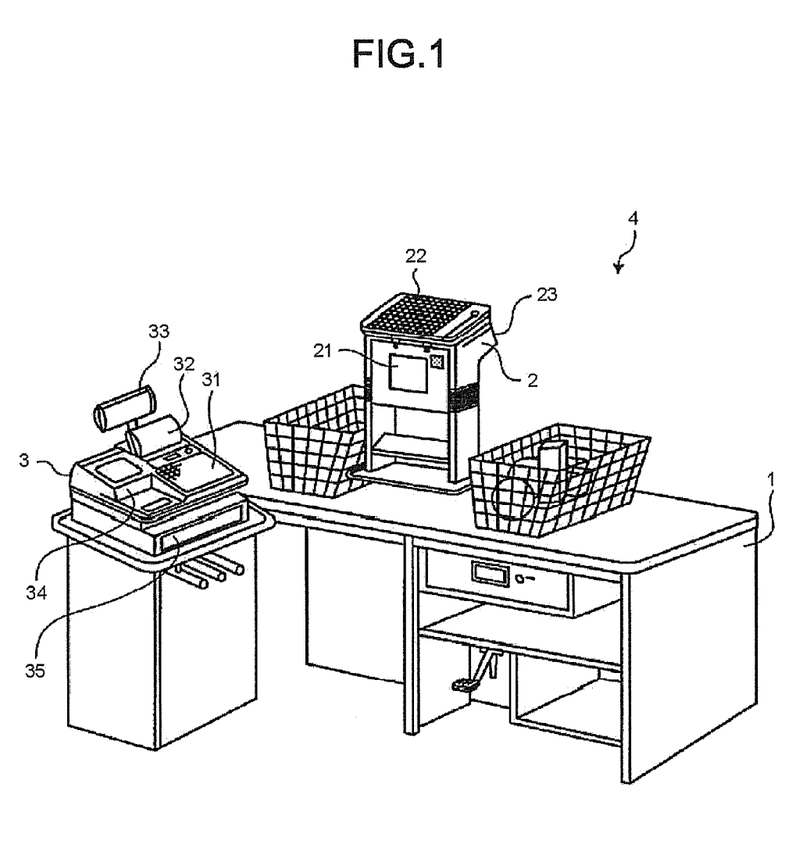
FIG. 1 is a perspective view schematically illustrating configurations of a checkout system comprising a code reading apparatus according to one embodiment.

FIG. 1 is a perspective view schematically illustrating configurations of a checkout system 4. As shown in FIG. 1, the checkout system 4 comprises a bagging platform 1 for placing a shopping basket in which commodities are put, a code reading apparatus 2 serving as an information processing apparatus, which is vertically arranged in the approximate center of the bagging platform 1, and a POS terminal 3 which is connected with the code reading apparatus 2 to be capable of carrying out communication by a transmission path not shown in figures.

The POS terminal 3 is used for carrying out the sales registration of the commodity purchased by a customer. As shown in FIG. 1, a keyboard 31, a display for operator 32, a display for customer 33, a printer 34 for carrying out receipt printing and the like, and a drawer 35 for storing cash and the like are arranged on the POS terminal 3. A closing key and the like necessary for the settlement of a commodity are arranged on the keyboard 31. The POS terminal 3 comprises configurations and functions the same as those of the POS terminal used in a checkout lane system in a standard manner.

The code reading apparatus 2 is used to read a bar code or a two-dimensional code assigned to a commodity, and a service display label which will be described below, and output the commodity information of the commodity and service information such as a discount and the like provided by the store to the POS terminal 3.

As shown in FIG. 1, the code reading apparatus 2 mainly comprises a reading window 21, a keyboard 22 and a display 23. The keyboard 22 accepts input from various keys when carrying out the registration of the commodity which cannot be registered by utilizing the bar code. The display 23 displays a commodity name, a price and the like of the registered commodity to a customer. A camera 20 (referring to FIG. 2) comprising an image capturing element such as a CCD (Charge Coupled Device) or a CMOS (Complementary Metal Oxide Semiconductor) and the like is internally arranged in die the code reading apparatus 2 equipped with the reading window 21.

Figure 2:
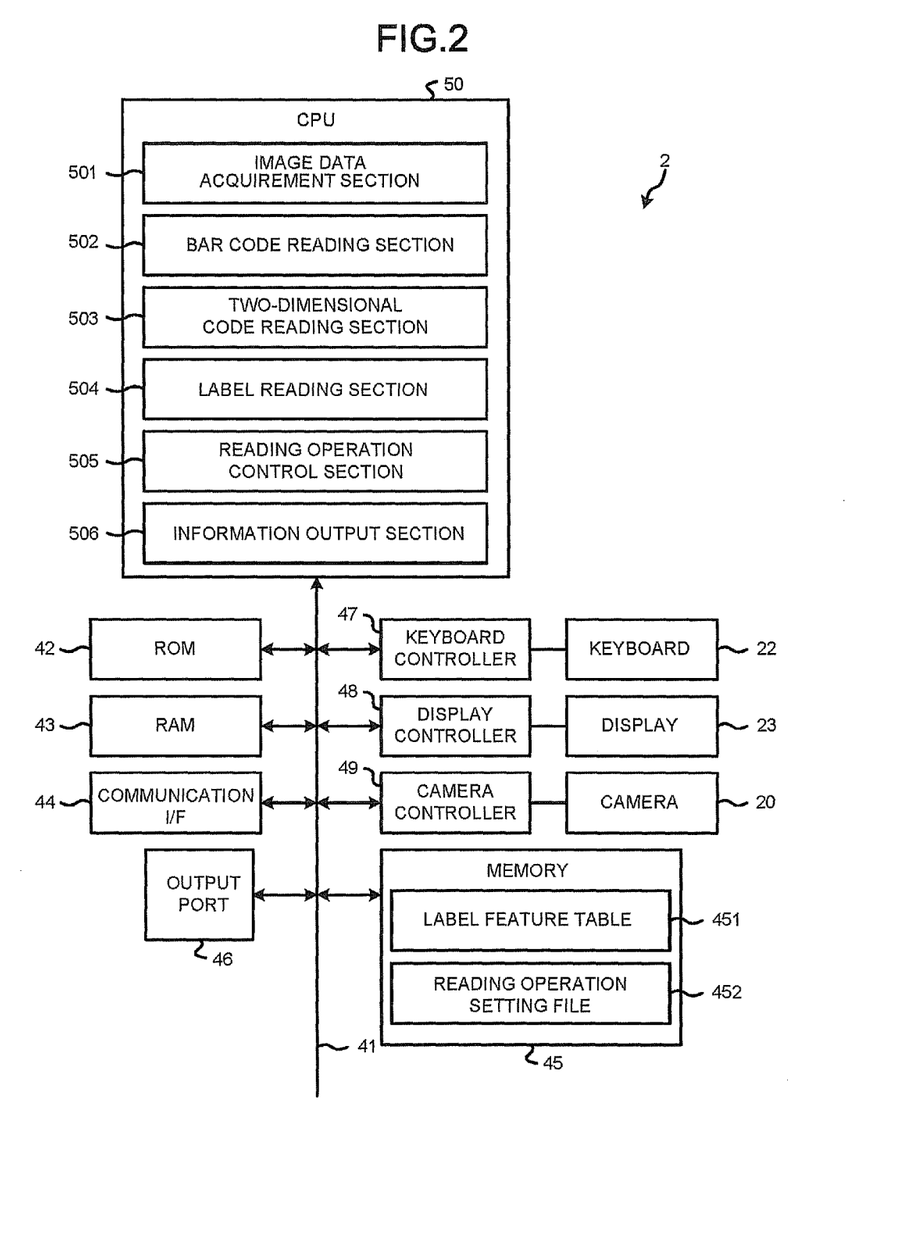
FIG. 2 is a block diagram illustrating configurations of the code reading apparatus.

FIG. 2 is a block diagram illustrating configurations of the code reading apparatus 2. The code reading apparatus 2 mainly comprises a CPU 50, a ROM 42, a RAM 43, a communication I/F 44, an output port 46, a keyboard controller 47, a display controller 48, a camera controller 49 and a memory 45 which are connected with each other through a bus line 41 such as an address bus, a data bus and the like.

The CPU 50 functions as a control section controlling all the operations of the code reading apparatus 2. The ROM 42 stores the program of the present embodiment, and other program controlling the operation of the CPU 50, and the like. The RAM 43 functions as a working area when the CPU 50 expands various programs stored in the ROM 42. In addition, various data such as image data captured by the camera 20 are stored in the RAM 43. In addition, the CPU 50 can measure a time by cooperating with a clock section (not shown) such as a RTC (Real Time Clock) and the like internally arranged in the code reading apparatus 2.

The communication I/F 44 controls the data communication with the POS terminal 3 (referring to FIG. 1) connected via a bus line. The output port 46 outputs a driving signal to a notification device (not shown) such as a buzzer, a display LED and the like. The keyboard controller 47 acquires a key signal from the keyboard 22. The display controller 48 controls the data display to the display 23. The camera controller 49 controls the image capturing operation of the camera 20.

The camera 20 captures a code symbol such as the bar code, the two-dimensional code and the like assigned to the commodity, and the service display label displaying a service such as a discount or point addition and the like.

Figure 3:
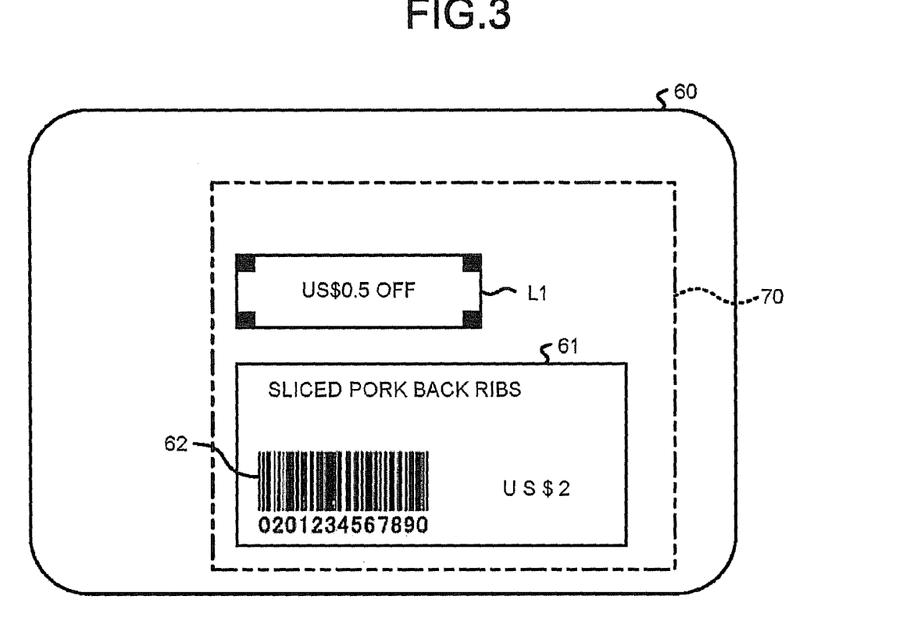
FIG. 3 is a diagram illustrating an example of a relationship between a commodity and an image capturing area of a camera.
Figure 4:
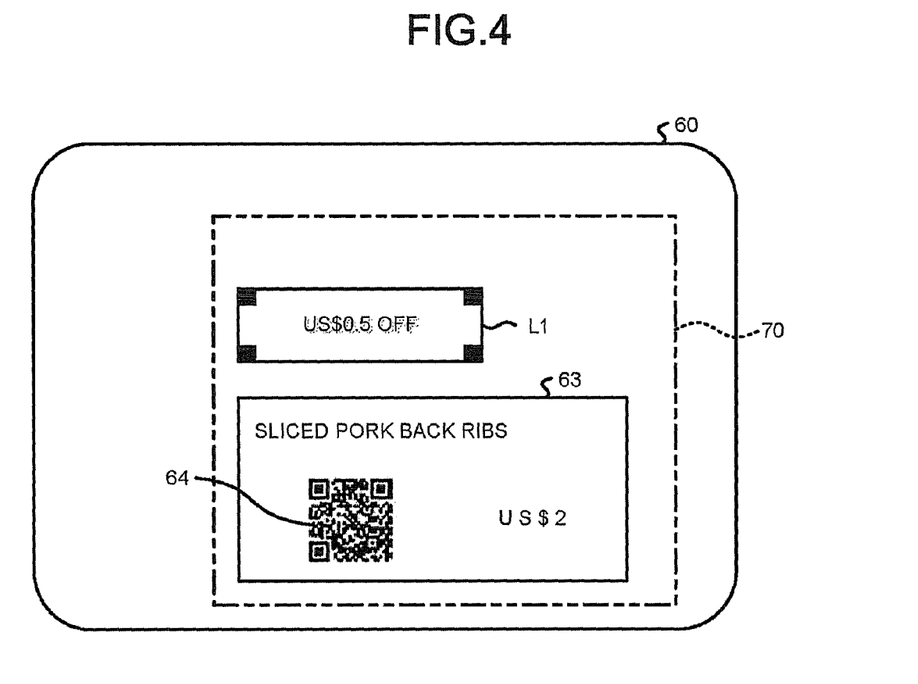
FIG. 4 is a diagram illustrating another example of the relationship between the commodity and the image capturing area of the camera.

Next, a relationship between the commodity processed by the code reading apparatus 2 of the present embodiment and an image capturing area of the camera 20 is described. FIG. 3 and FIG. 4 are diagrams exemplarily illustrating a relationship between the commodity 60 and an image capturing area of the camera 20. An area in the two dotted lines in the figure is an area which can be captured with one frame by the camera 20, namely an image capturing area 70.

A bar code label 61 is attached to the commodity 60 shown in FIG. 3. A commodity name "sliced pork back ribs", a commodity price "US$2", and a bar code 62 and the like are displayed on the bar code label 61. The information such as a commodity code and the like is incorporated into the bar code 62 as the commodity information needed when the POS terminal 3 registers the sales data of the commodity 60. In addition, the commodity code "0201234567890" incorporated into the bar code 62 is displayed with numerals at the lower portion of the bar code 62.

In addition, the commodity information is not limited to the form of being incorporated into the bar code, and as shown in FIG. 4, can be also in the form of being incorporated into the two-dimensional code. Herein, a two-dimensional code label 63 is attached to the commodity 60 shown in FIG. 4. A commodity name "sliced pork back ribs", a commodity price "US$2", and a two-dimensional code 64 and the like are displayed on the two-dimensional code label 63. The information such as a commodity code and the like is incorporated into the two-dimensional code 64 as the commodity information needed when the POS terminal 3 registers the sales data of the commodity 60.

In addition, a discount label L1 as an example of the service display label can be attached to the bar code label 61 or the two-dimensional code label 63. Character information "US$0.5 off from the display price" representing the discount amount of the commodity 60 is displayed on the discount label L1.

Figure 5:
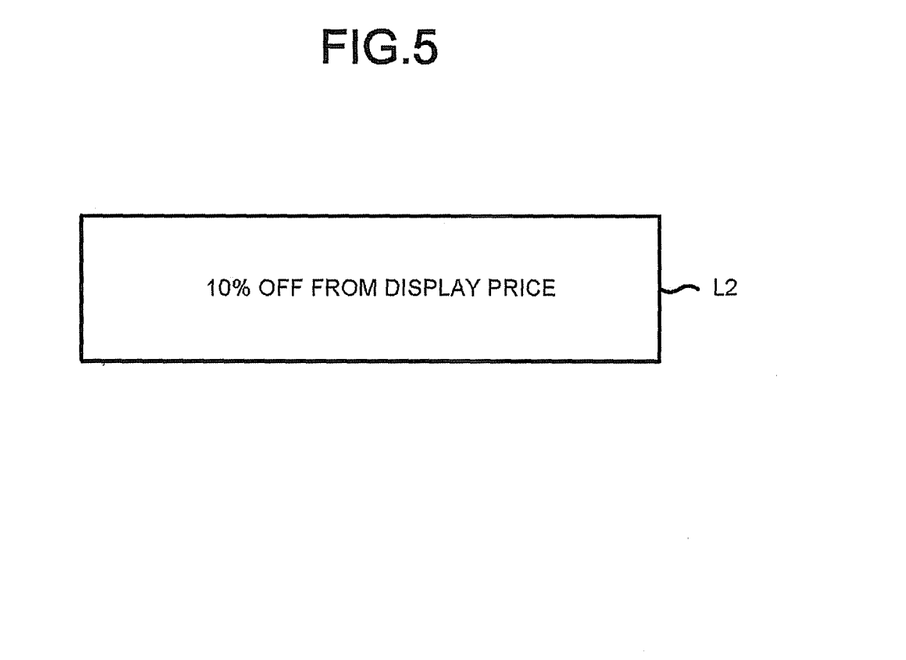
FIG. 5 is a diagram illustrating a discount label.
Figure 6:
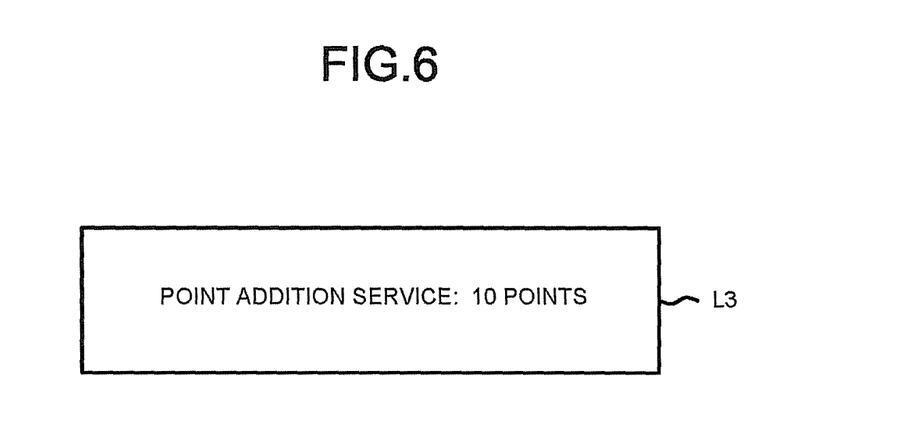
FIG. 6 is a diagram illustrating a point addition label.

In addition, as the service display label, it is fine so long as it is attached to the commodity 60, and furthermore, displays the service relating to the service provided when the commodity 60 is purchased. As other example of the service display label, there exist a discount label L2 displaying the discount rate of the commodity 60 as shown in FIG. 5, and a point addition label L3 displaying the number of points granted to the customer purchasing the commodity 60, which is more than a usual number of granted points as shown in FIG. 6, and the like.

Back to FIG. 2, a label feature table 451 associating the feature of the service display label with a service content displayed by the service display label, and a reading operation setting file 452 for specifying the operation timing of each reading section (a bar code reading section 502, a two-dimensional code reading section 503, and a label reading section 504) which will be described below, and the like, are stored in the non-volatile memory 45.

Figure 7:
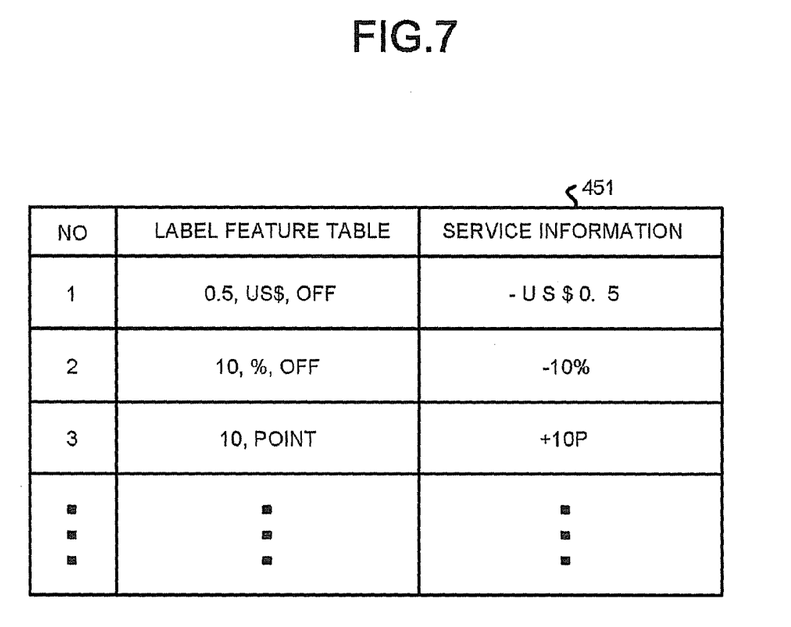
FIG. 7 is a diagram illustrating a label feature table.

FIG. 7 is a diagram illustrating the label feature table 451. As shown in FIG. 7, label feature data denoting the features of a character and a symbol contained in the service display label and the service information given to the commodity according to the service display label are stored in the label feature table 451 in an associative manner.

More specifically, the so-called label feature data refer to the information extracted from the service display label by character recognition processing such as an OCR and the like from the service display label, and pattern recognition processing and the like. Namely, as shown in FIG. 3 and FIG. 4, for such a discount label L1 of "US$0.5 off from the display price", as shown by the label feature data of No. 1 in the label feature table 451 in FIG. 7, such information of "0.5, US$, off" is extracted by the character recognition processing. Similarly, for the labels L2 and L3 shown in FIG. 5 and FIG. 6, as shown by the label feature data of No. 2 and No. 3 in FIG. 7, the information relating to such a discount and point granting of "10, %, off" and "10, point" is extracted.

The so-called service information refers to the information obtained by converting the information relating to the service, such as discount information, point granting information and the like read from the service display label into an alphanumeric value which can be used in the sales registration processing of the POS terminal 3. Namely, as shown in FIG. 7, the service information "−US$0.5" denoting a discount of US$0.5 is stored in association with the label feature data "0.5, US$, off". In addition, the service information "−10%" denoting a discount of 10% is stored in association with the label feature data "10, %, off". Moreover, the service information "+10P" denoting the point addition of 10 points is stored in association with the label feature data "10, point".

Figure 8:
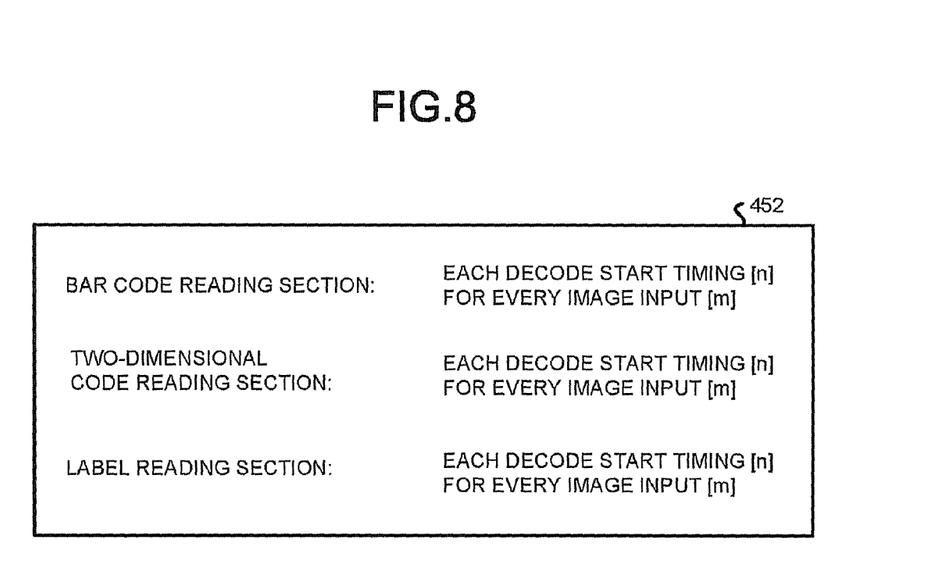
FIG. 8 is a diagram illustrating a reading operation setting file.

FIG. 8 is a diagram illustrating the reading operation setting file 452. As shown in FIG. 8, the setting information for specifying the operation timing for each reading section (the bar code reading section 502, the two-dimensional code reading section 503, and the label reading section 504) which will be described below is stored in the reading operation setting file 452.

Herein, a frequency of carrying out reading processing, a timing of starting the processing and a priority order of the processing can be set in the setting information. More specifically, by setting a setting value "m" shown in the figure to be a random numerical value (an integer), the frequency of carrying out the reading processing can be specified based on the image capturing (acquirement) timing of the image data serving as a cycle time reference. For example, when m is set to be 1, the reading processing is carried out every one image data is acquired. In addition, when m is set to be 2, the reading processing is carried out every two image data are acquired.

In addition, a setting value "n" shown in the figure is interlocked with the setting value "m", and may be set to be any value (above 0) less than the value of "m". For example, when m is set to be 2, the reading processing may be designated to be carried out at the timing when the first half image data is acquired or when the second half image data is acquired according to the value of "n" (0 or 1). For example, when n is set to be 0, the reading processing is carried out at the timing when the first half image data is acquired, and when n is set to be 1, the reading processing is carried out at the timing when the second half image data is acquired.

In addition, the setting order of each reading section (the bar code reading section 502, the two-dimensional code reading section 503, the label reading section 504) shown in FIG. 8 corresponds to the priority order, and is constituted to be that the earlier the reading section is set, the more preferentially the processing is carried out. In addition, the setting item and the setting manner of the reading operation setting file 452 are not limited to the example in FIG. 8.

Next, the featured functions of the code reading apparatus 2 of the present embodiment are described. The CPU 50 operates according to the program expanded in the RAM 43 and stored in the ROM 42, and as shown in FIG. 2, functions as an image data acquirement section 501, the bar code reading section 502, the two-dimensional code reading section 503, the label reading section 504, a reading operation control section 505 and an information output section 506.

The image data acquirement section 501 outputs an ON-signal of image capturing to the camera controller 49 to enable the camera 20 to start the image capturing operation. The image data acquirement section 501 acquires the image data in the image capturing area 70 captured by the camera 20 and stores the image data in an image working area of the RAM 43.

The bar code reading section 502 carries out bar code reading processing, namely, detects the image of the bar code 62 from the image data stored in the image working area of the RAM 43 by the image data acquirement section 501, and reads the commodity information of the commodity 60 according to the detected bar code 62.

In more detail, the bar code reading section 502 detects whether or not a data area relating to the bar code 62 exists in a binary data of the image data of one frame stored in the image working area of the RAM 43. If the data area relating to the bar code 62 is detected in the acquired image data, the bar code reading section 502 decodes the bar code 62, and reads bar code data such as a JAN code, an EAN code, a UPC (Universal Product Code) and the like as the commodity information of the commodity 60. The bar code reading section 502 stores the read bar code data in the RAM 43.

The two-dimensional code reading section 503 carries out two-dimensional code reading processing, namely, detects the image of the two-dimensional code 64 from the image data stored in the image working area of the RAM 43 by the image data acquirement section 501, and reads the commodity information of the commodity 60 from the detected two-dimensional code 64.

In more detail, the two-dimensional code reading section 503 detects whether or not a data area relating to the two-dimensional code 64 exists in a binary image data of the image data of one frame stored in the image working area of the RAM 43. If the data area relating to the two-dimensional code 64 is detected in the acquired image data, the two-dimensional code reading section 503 decodes the two-dimensional code 64, and reads two-dimensional code data such as the JAN code, the EAN code, the UPC (Universal Product Code) and the like as the commodity information of the commodity 60. In addition, the two-dimensional code reading section 503 stores the read two-dimensional code data in the RAM 43.

The label reading section 504 carries out label reading processing, namely, detects the image of the service display label for the image data stored in the image working area of the RAM 43 by the image data acquirement section 501. The label reading section 504 reads the service information (referring to FIG. 7) from the detected image of the service display label if the image of the service display label is detected.

Specifically, the label reading section 504 carries out the processing such as character recognition such as the OCR (Optical Character Reader) and the like, or pattern recognition and the like for the image data of one frame stored in the image working area of the RAM 43. The label reading section 504 compares the feature of the character, pattern, symbol and the like contained in the service display label with the label feature data (referring to FIG. 7) of the label feature table 451, and determines that the service display label is detected in the image data if the label feature data with a high degree of coincidence are detected.

In addition, the label reading section 504 reads the service information of the label feature table 451 corresponding to the detected label feature data as the service information of the commodity 60. Moreover, the label reading section 504 stores the read service information in the RAM 43. In addition, it may be also set that the content of the service information is encoded according to a specified encoding rule, and the encoded service code is stored in the RAM 43.

In addition, in order to prevent from repeatedly reading the code symbol (the bar code, the two-dimensional code) and the label attached to the same commodity, the bar code reading section 502, the two-dimensional code reading section 503 and the label reading section 504 abandon a reading result when the same code symbol and label are read during a specified period (for example, three seconds and the like).

The reading operation control section 505 controls the operation timings of the bar code reading section 502, the two-dimensional code reading section 503 and the label reading section 504 based on the setting content of the reading operation setting file 452.

Figure 9:
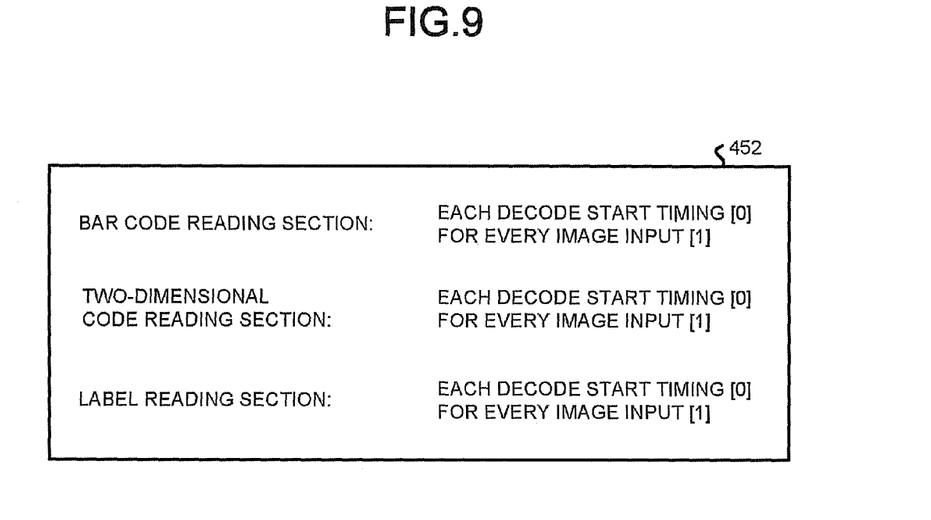
FIG. 9 is a diagram illustrating a setting example of the reading operation setting file.
Figure 10:
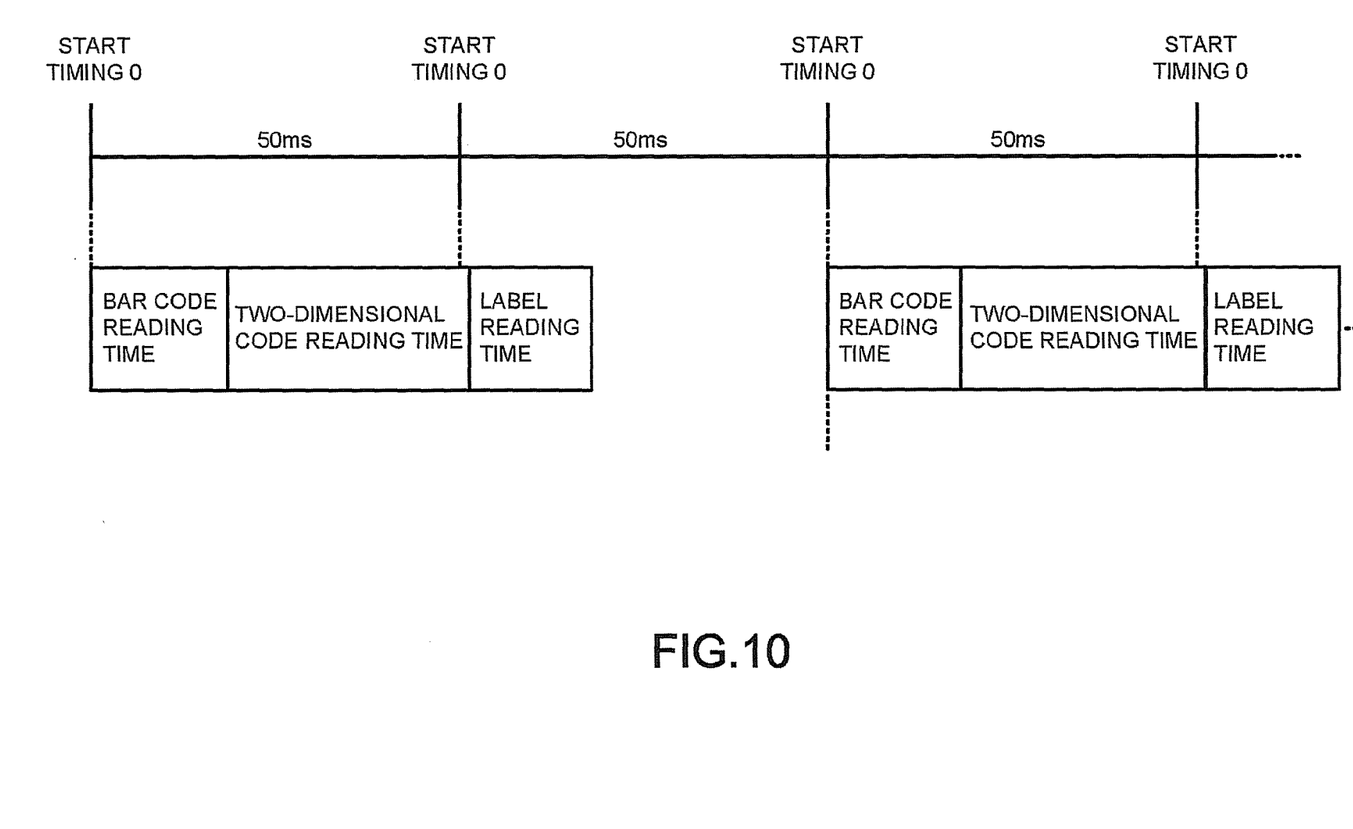
FIG. 10 is a diagram illustrating an operation example of the code reading apparatus corresponding to a setting content in FIG. 9.

For example, when the reading operation setting file 452 is the setting content shown in FIG. 9, as shown in FIG. 10, the reading operation control section 505 sets the acquirement timing of the captured image by the image data acquirement section 501 serving as the cycle time reference to be a start timing "0", and enables the bar code reading section 502, the two-dimensional code reading section 503 and the label reading section 504 to operate in sequence from the start timing "0". In addition, the "bar code reading time" refers to the time till the bar code reading section 502 completes the reading processing, the "two-dimensional code reading time" refers to the time till the two-dimensional code reading section 503 completes the reading processing, and the "label reading time" refers to the time till the label reading section 504 completes the reading processing.

Herein, the acquirement interval of the captured image is 50 ms, and the total processing time of the bar code reading section 502, the two-dimensional code reading section 503 and the label reading section 504 is more than 50 ms. In this case, the total processing time of the bar code reading section 502, the two-dimensional code reading section 503 and the label reading section 504 exceeds the acquirement interval 50 ms of the captured image, and therefore, the operation of the bar code reading section 502 cannot be started at the next start timing "0". Therefore, there exists a problem that the reading processing can be only carried out every two start timing "0" and the reading efficiency is low.

Figure 11:
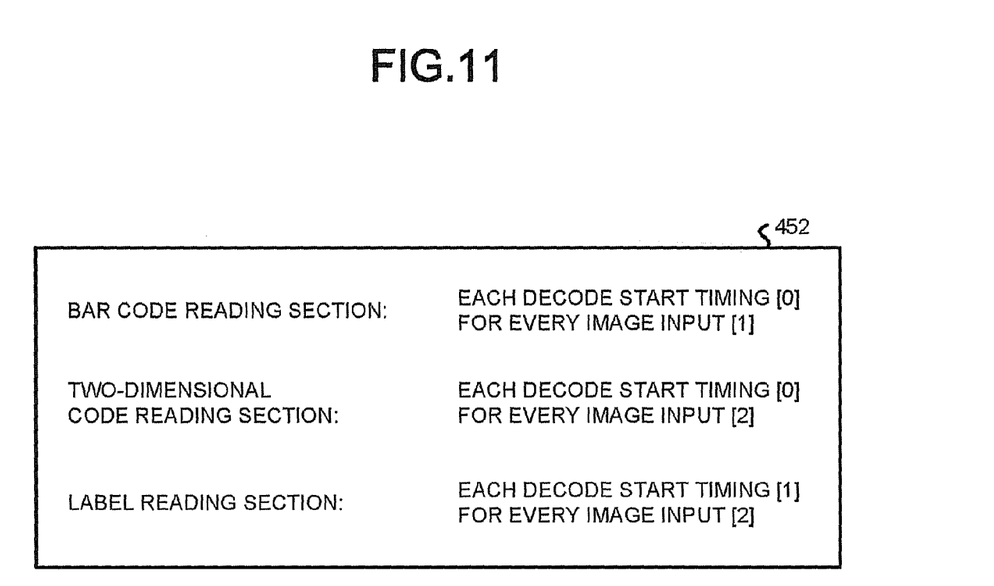
FIG. 11 is a diagram illustrating a setting example of the reading operation setting file.
Figure 12:
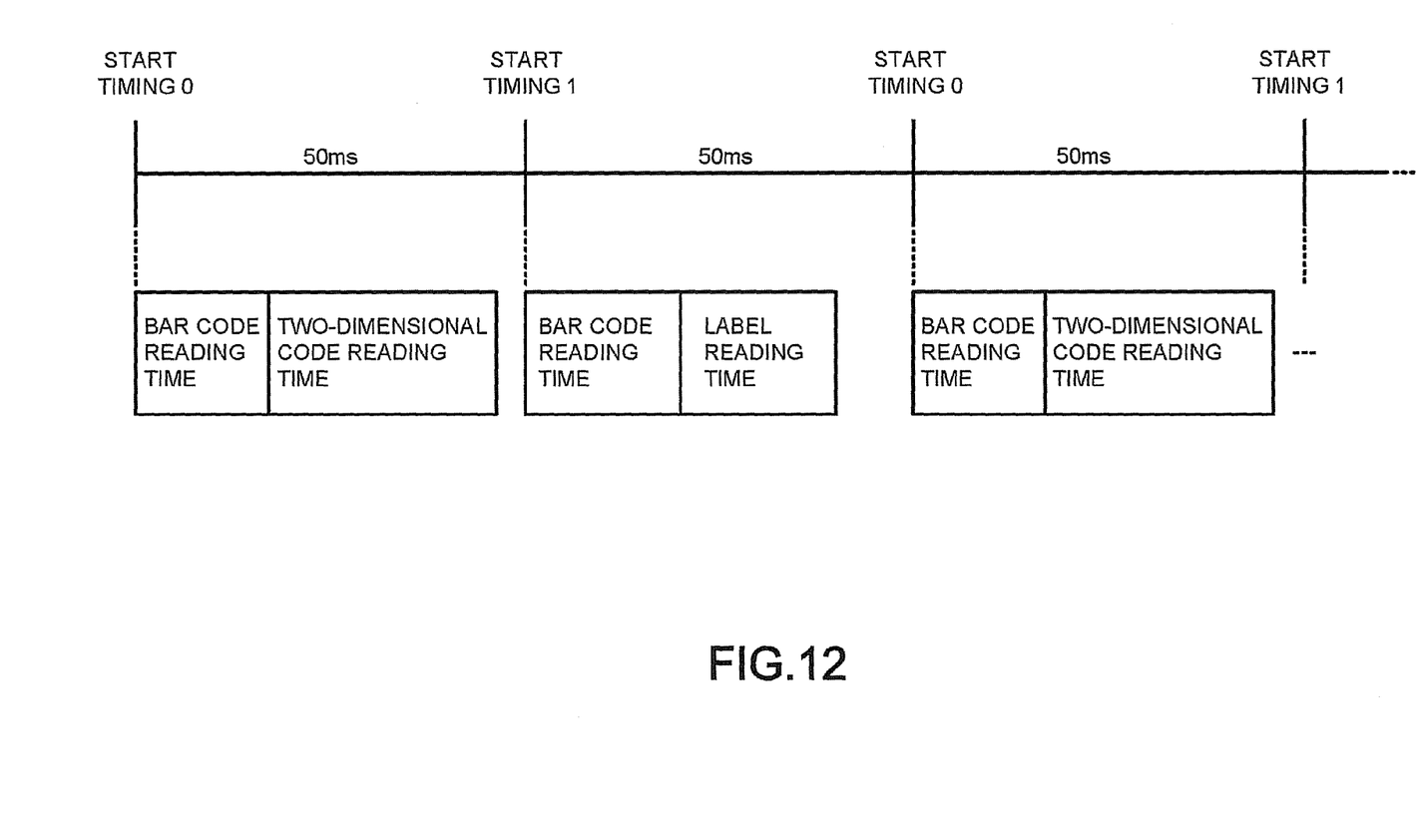
FIG. 12 is a diagram illustrating an operation example of the code reading apparatus corresponding to a setting content in FIG. 11.

Therefore, in such a case, for example, the reading processing can be carried out efficiently by setting the reading operation setting file 452 as the setting content shown in FIG. 11. In a condition that the setting content is adopted, the reading operation control section 505, as shown in FIG. 12, alternately sets the continuous acquirement timing of the captured image performed by the image data acquirement section 501 serving as the cycle time reference as the start timing "0" and the start timing "1". In addition, the reading operation control section 505 enables the bar code reading section 502 and the two-dimensional code reading section 503 to act in sequence from the start timing "0", and enables the bar code reading section 502 and the label reading section 504 to act in sequence from the start timing "1".

Herein, in the condition of an operation example in FIG. 12, it is set that the bar code reading section 502 and the two-dimensional code reading section 503 are in one group and the bar code reading section 502 and the label reading section 504 are in one group, and each group is enabled to act at the start timing "0" and the start timing "1" respectively, and therefore, the reading processing of each group can be completed within the acquirement interval 50 ms of the captured image serving as a cycle time.

In this way, in the present embodiment, the operations of the bar code reading section 502, the two-dimensional code reading section 503 and the label reading section 504 can be controlled corresponding to the setting content of the reading operation setting file 452, therefore, the reading processing can be carried out efficiently by setting the operation timing in a manner that the reading sections of which the sum of the operation time needed by a reading operation is less than the cycle time are divided into one group. In addition, the reading processing can be carried out more efficiently by specifying the frequency of the reading processing of the reading section according to the actual reading result of each reading section.

In addition, the setting content of the reading operation setting file 452 can be randomly set, and can be also in the form that the reading operation control section 505 dynamically changes a setting corresponding to the operation state of the code reading apparatus 2. In the condition that the form is adopted, the reading operation control section 505 records the operation record of the bar code reading section 502, the two-dimensional code reading section 503 and the label reading section 504, and calculates the actual reading result of each reading section for each specified time. Herein, the actual reading result, for example, refers to the number of the commodity information and the service information actually read by each reading section.

The reading operation control section 505 sets the execution frequency of each reading section in the reading operation setting file 452 according to the calculated actual reading result of each reading section. In addition, the reading operation control section 505 adjusts the start timing and the priority order of each reading section such that the sum of the processing time of each reading section is less than the acquirement interval of the captured image, and sets them in the reading operation setting file 452. Thereby, the reading operation setting file 452 which can efficiently carry out the reading processing of the bar code reading section 502, the two-dimensional code reading section 503 and the label reading section 504 can be automatically set.

Back to FIG. 2, the information output section 506 outputs the information (the commodity information, the service information) relating to the commodity 60 read in the reading processing performed by the bar code reading section 502, the two-dimensional code reading section 503 and the label reading section 504 to the POS terminal 3. In addition, the information read by each reading section can be output individually, and can be also output as one piece of composite information.

The POS terminal 3 carries out the sales registration of granting the service content shown by the service information to the commodity 60 based on the commodity code contained in the commodity information received from the code reading apparatus 2.

As an example, as shown in FIG. 3, in the condition that the discount label L1 of "US$0.5 off" is attached on the commodity 60, the service information "−US$0.5" read by the label reading section 504 is output to the POS terminal 3 together with the commodity code read from the bar code 62 by the bar code reading section 502. The POS terminal 3 reads the price of the commodity 60 corresponding to the commodity code with reference to a commodity master file and the like held by the POS terminal 3 or a host terminal (not shown) in the store. Moreover, the POS terminal 3 discounts US$0.5 from the read price based on the service information, and carries out the sales registration of the commodity.

Figure 13:
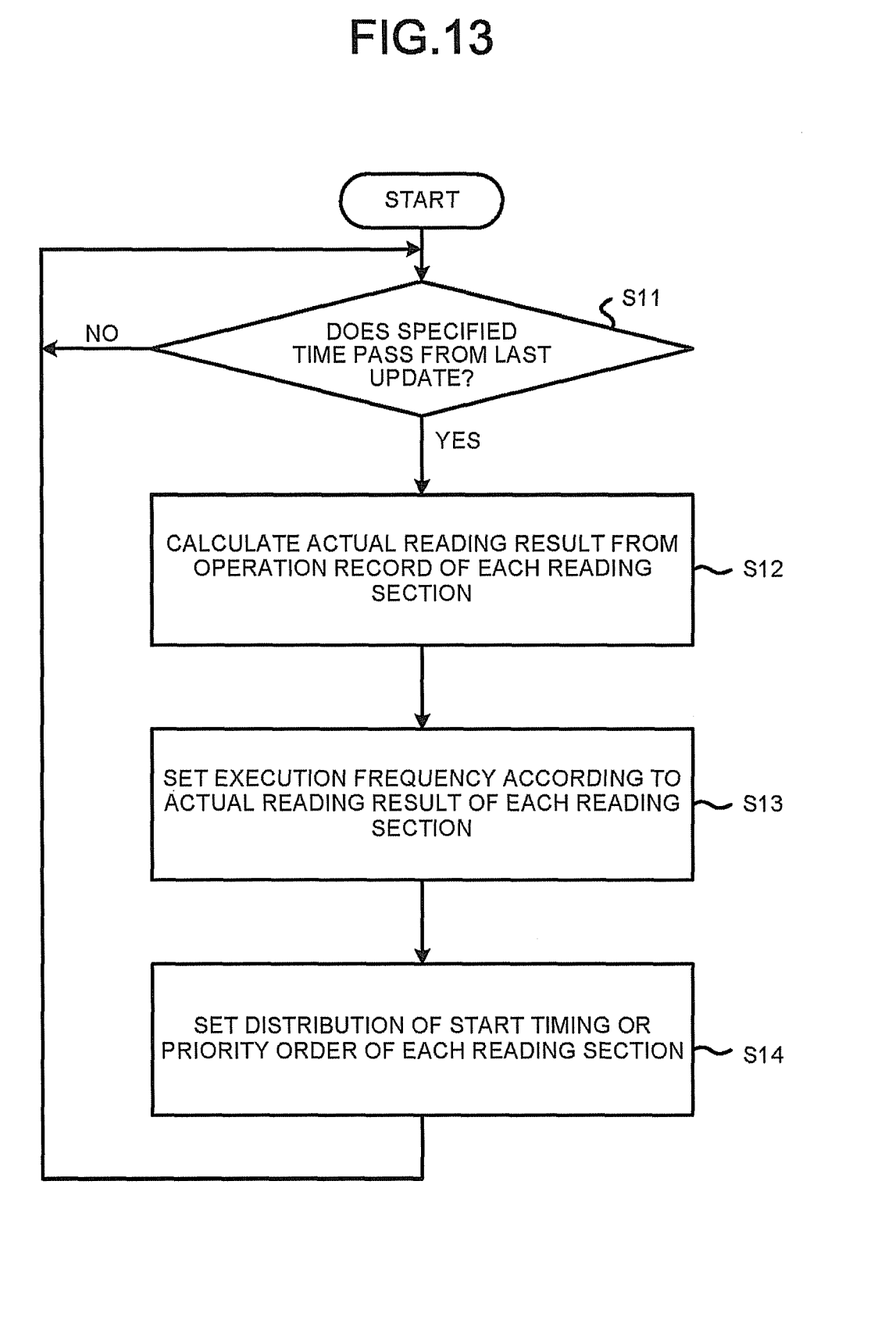
FIG. 13 is a flowchart illustrating a procedure of an operation timing setting processing carried out by the code reading apparatus.

Next, the operations of the code reading apparatus 2 with the configurations mentioned above are described. First, the operation timing setting processing carried out by the code reading apparatus 2 is described with reference to FIG. 13. Herein, FIG. 13 is a flowchart illustrating the procedure of the operation timing setting processing carried out by the code reading apparatus 2.

The reading operation control section 505 of the code reading apparatus 2 waits till the specified time passes from the moment when the reading operation setting file 452 is set (updated) at a former time (NO in ACT S11). If the specified time passes (YES in ACT S11), the reading operation control section 505 calculates the actual reading result according to the operation record of the bar code reading section 502, the two-dimensional code reading section 503 and the label reading section 504 (ACT S12). Subsequently, the reading operation control section 505 sets the execution frequency of each reading section in the reading operation setting file 452 according to the actual reading result calculated in ACT S12 (ACT S13).

Afterwards, the reading operation control section 505 sets the distribution of the start timing and the priority order of each reading section such that the sum of the processing time of each reading section is less than the acquirement interval of the captured image (ACT S14), and then the flow returns to ACT S11 again. By the processing above, the setting content of the reading operation setting file 452 is automatically updated.

Figure 14:
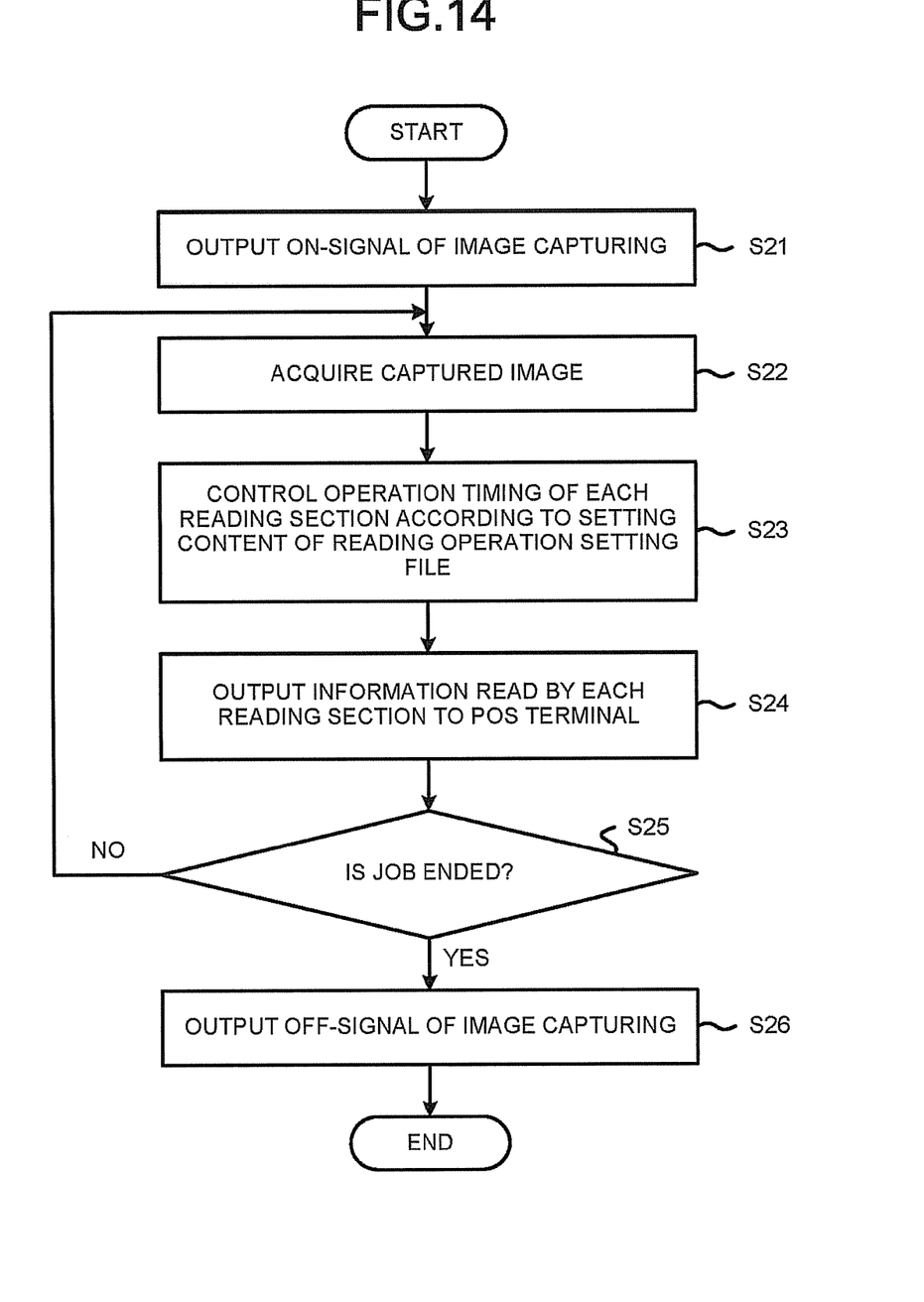
FIG. 14 is a flowchart illustrating a procedure of a data output processing carried out by the code reading apparatus.

Next, the data output processing carried out by the code reading apparatus 2 is described with reference to FIG. 14. Herein, FIG. 14 is a flowchart illustrating the procedure of the data output processing carried out by the code reading apparatus 2.

If the processing is started according to the start of the commodity registration by the POS terminal 3, the image data acquirement section 501 of the code reading apparatus 2 outputs an ON-signal of image capturing to the camera 20 to enable the camera 20 to start image capturing (ACT S21). The image data acquirement section 501 acquires the frame image (captured image) which is captured by the camera 20 and is stored in the RAM 43 in sequence (ACT S22).

The reading operation control section 505 controls the operation timing of each reading section of the bar code reading section 502, the two-dimensional code reading section 503 and the label reading section 504 based on the acquirement timing in ACT S22 according to the setting content of the reading operation setting file 452 (ACT S23). Subsequently, the information output section 506 outputs the information (the commodity information, the service information) read in the reading processing performed by the bar code reading section 502, the two-dimensional code reading section 503 and the label reading section 504 to the POS terminal 3 (ACT S24).

Afterwards, the CPU 50 determines whether or not the job is ended according to an ending notice of the commodity registration from the POS terminal 3 (ACT S25). Herein, if the job is continued (NO in ACT S25), the CPU 50 returns to ACT S22 to continuously carry out the processing. In addition, if the job is ended (YES in ACT S25), the image data acquisition section 501 outputs an OFF-signal of image capturing to the camera 20 to end the image capturing (ACT S26), and ends the processing.

As stated above, according to the present embodiment, even in the condition that the information relating to the commodity is read in sequence from the captured image of the commodity by a plurality of reading sections, the processing relating to the reading can be carried out efficiently by setting the operation timing in a manner that the reading sections of which the sum of the operation time needed by a reading operation is less than the cycle time are divided into one group. In addition, as the setting of the operation timing can be automatically carried out, and moreover, the execution frequency can be automatically set according to the actual reading result of each reading section, therefore, the code reading apparatus 2 which can efficiently carry out the reading of the information relating to the commodity can be realized.

While certain embodiments have been described, these embodiments have been presented by way of example only, and are not intended to limit the scope of the invention. Indeed, the embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

For example, in the embodiment, the code reading apparatus 2 is in the form of comprising the label feature table 451 and the reading operation setting file 452, but it is not limited to this, and can be also in the form that other apparatus such as the POS terminal 3 and the like comprises one part or all of the label feature table 451 and the reading operation setting file 452 in a referable state from the code reading apparatus 2.

In addition, in the embodiment, it is in the form that the commodity information and the service information are read from the captured image of the commodity as the information relating to the commodity, but it is not limited to this, and it can be also in the form that other information is read. For example, in the condition that a price tag is attached to the commodity, it can be also in the form that the commodity price is read from the price tag.

In addition, in the embodiment, an example comprising three reading sections (the bar code reading section 502, the two-dimensional code reading section 503, the label reading section 504) is described, but the number of the reading section is not limited to this, and it can be the configuration of comprising two reading sections by comprising the reading section which can read the bar code and the two-dimensional code, and can also be the configuration of comprising more than four reading sections by comprising the reading section reading other information.

In addition, in the embodiment, an example of using a stationary type scanner apparatus (code reading apparatus 2) is described, but it is not limited to this, and it can be also in the form that a so-called handy type scanner apparatus is connected with the POS terminal 3.

In addition, in the embodiment, in the checkout system 4 consisting of the code reading apparatus 2 and the POS terminal 3, the embodiment described herein is applied to the code reading apparatus 2, but it is not limited this, and it can be also applied to an apparatus comprising the functions of the code reading apparatus 2 and the POS terminal 3, or the checkout system constituted by connecting the code reading apparatus 2 with the POS terminal 3 in a wired or wireless manner. As the apparatus comprising the functions of the code reading apparatus 2 and the POS terminal 3, a self checkout apparatus (hereinafter, called as self POS only) arranged and used in a store such as a supermarket and the like is listed.

Figure 15:
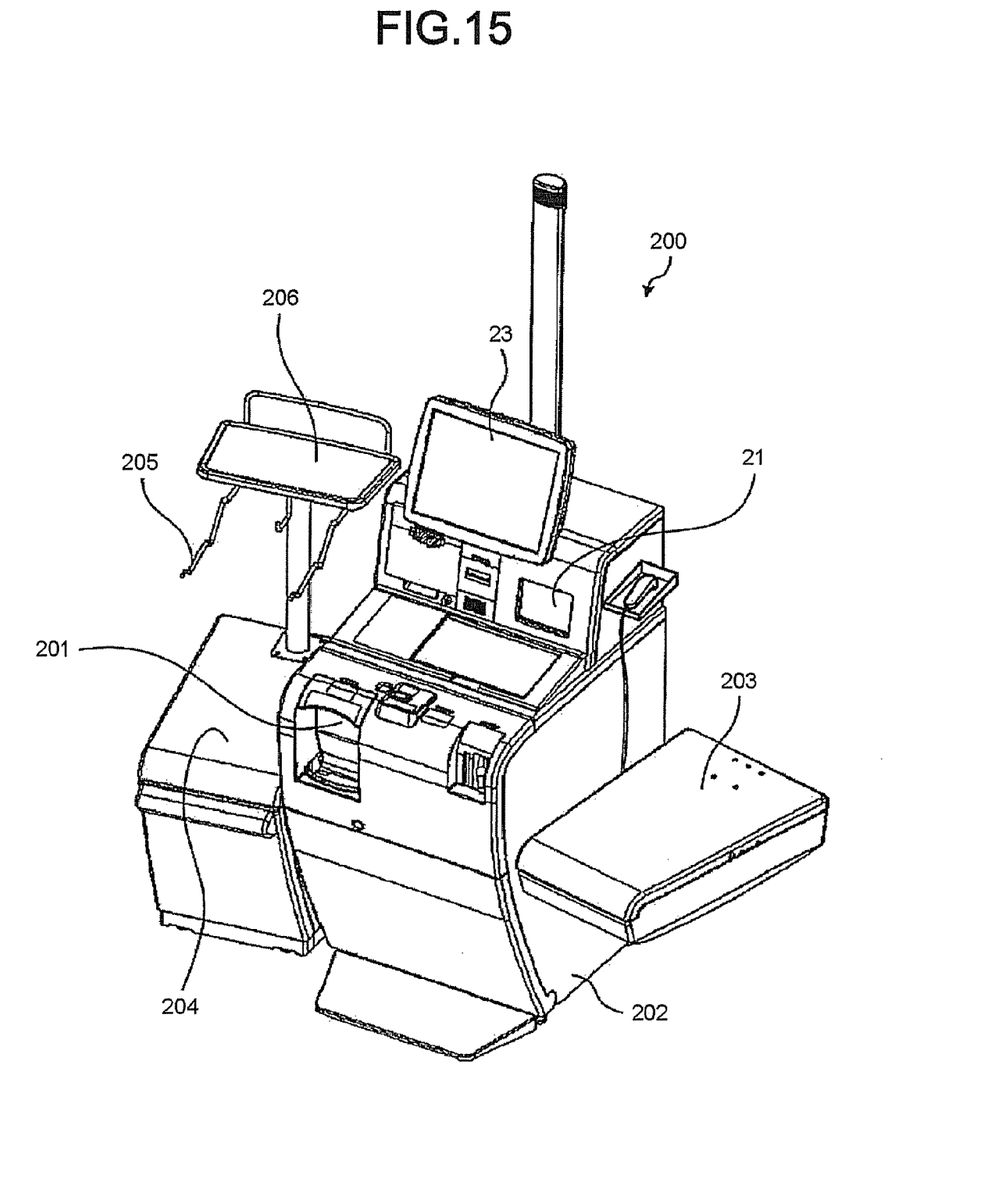
FIG. 15 is a perspective view illustrating external configurations of a self POS.
Figure 16:
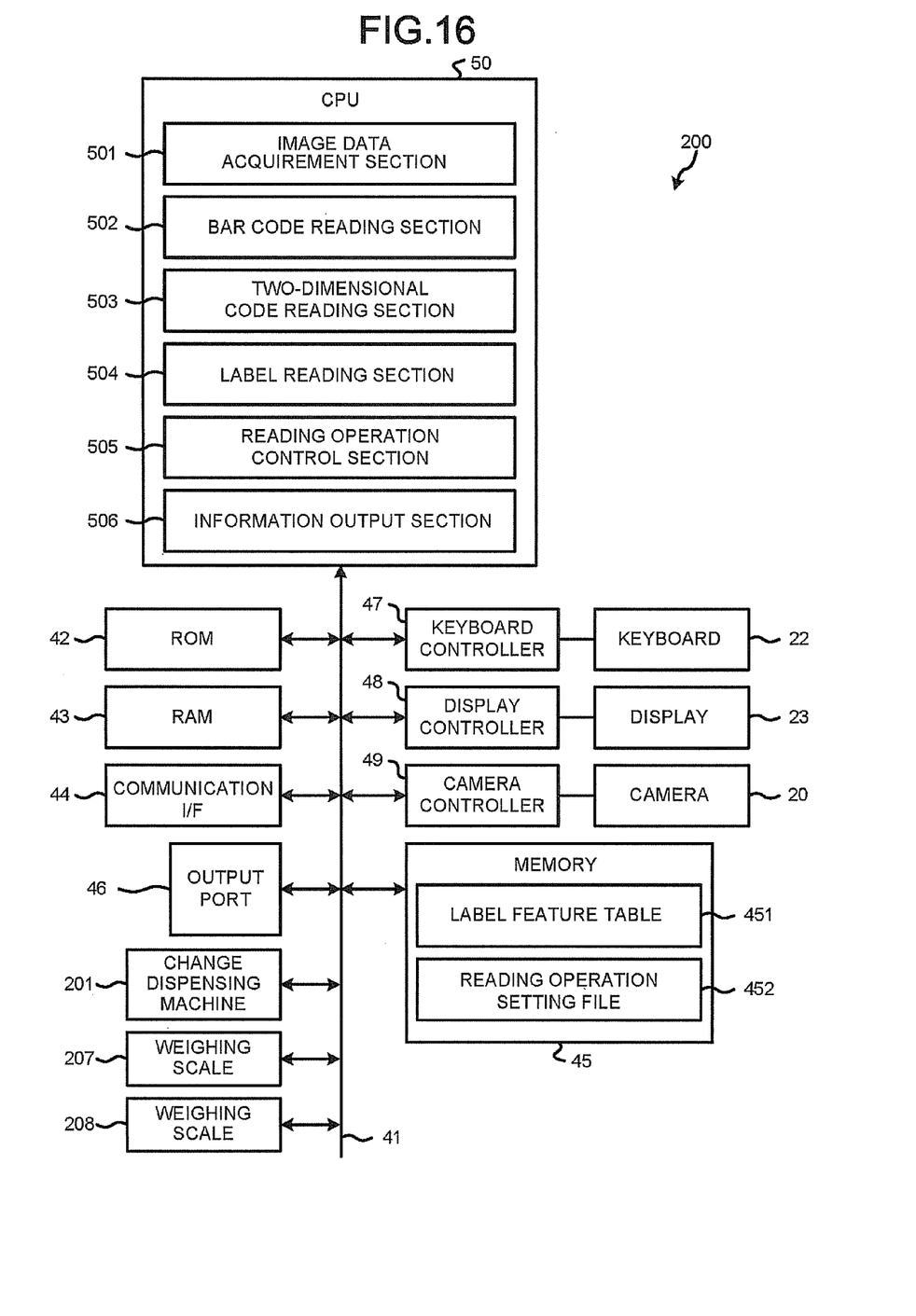
FIG. 16 is a block diagram illustrating hardware arrangement of the self POS.

Herein, FIG. 15 is a perspective view illustrating external configurations of the self POS 200, and FIG. 16 is a block diagram illustrating hardware arrangement of the self POS 200. In addition, hereinafter, the same configurations shown in FIG. 1 and FIG. 2 are denoted with the same signs and are therefore not described repeatedly.

As shown in FIG. 15 and FIG. 16, a main body 202 of the self. POS 200 comprises the configurations such as the reading window 21 inside which the camera 20 is arranged, and the display 23 on the surface of which a touch panel is arranged, and the like.

The display 23 may be, for example, a liquid crystal display. A guidance screen for providing the customer a guidance for the operation of the self POS 200, various input screens, a registration screen for displaying the commodity information read by the commodity reading section 110 and a settlement screen on which a total amount, a prepayment amount and a change amount as well as a payment method selection are displayed on the display 23.

The code reading apparatus 2 reads a commodity image by utilizing the camera 20 when a customer holds the code symbol and the label attached to the commodity over the reading window 21.

In addition, a commodity placing table 203 for placing the unsettled commodity in the shopping basket is arranged on the right side of the main body 202, and on the left side of the main body 202, a commodity placing table 204 for placing the settled commodity, a bag hook 205 for hooking a bag for placing the settled commodities and a temporary placing table 206 for placing the settled commodities temporarily before the settled commodities are placed into a bag are arranged. The commodity placing tables 203 and 204 are provided with weighing scales 207 and 208 respectively, and are therefore capable of confirming whether or not the weight of commodities is the same before and after a settlement.

Further, a change dispensing machine 201 for inputting bill for settlement and outputting bill as change is arranged in the main body 202 of the self POS 200.

In the case where the self POS 200 having such configurations is applied to embodiments of the present invention, the self POS 200 functions as an information processing apparatus. Further, the apparatus comprising the functions of the code reading apparatus 2 and the POS terminal 3 may be an apparatus provided with no weighing scales 207 and 208, but not limited to the self POS 200 having the configurations above.

Further, in the embodiment above, the programs executed by each apparatus are pre-incorporated in the storage medium (ROM or storage section) of each apparatus, however, the present invention is not limited to this, the programs may be recorded in a computer-readable recording medium such as CD-ROM, flexible disk (FD), CD-R, DVD (Digital Versatile Disk) and the like in the form of installable or executable file. Further, the storage medium, which is not limited to a medium independent from a computer or an incorporated system, further includes a storage medium for storing or temporarily storing the downloaded program transferred via an LAN or an Internet.

In addition, the programs executed by each apparatus described in the embodiments above may be stored in a computer connected with a network such as an Internet to be provided through a network download or provided or distributed via a network such as an Internet.

Alternatively, the programs mentioned in the embodiments above may be incorporated in a portable information terminal such as a mobile phone having a communication function, a smart phone, a PDA (Person Digital Assistant) and the like to realize the functions of the programs.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An information processing apparatus, comprising:
an acquirement unit configured to acquire a captured image obtained by capturing a commodity at predetermined acquirement intervals by an image capturing unit in sequence;
a plurality of reading units configured to read information relating to the commodity respectively from the captured image acquired by the acquirement unit;
a control unit configured to enable each of the reading units to act in a predetermined order based on setting information in which operation timing of each of the reading units is set; and
an output unit configured to output the information read by the reading unit,
wherein the setting information is set such that at least two reading units of the reading units start to operate in the predetermined order from a starting point of the predetermined acquirement interval, and the reading unit which is set to be last in the predetermined order of the at least two reading units completes processing of the last reading unit before an end point of the predetermined acquirement interval.

2. The information processing apparatus according to claim 1, wherein
the operation timing of each of the reading units is set in a manner that the reading units of which the sum of the operation time period needed by a reading operation is less than a specified cycle time are divided into one group.

3. The information processing apparatus according to claim 2, wherein the cycle time is an interval that the acquirement unit acquires the captured image.

4. The information processing apparatus according to claim 1, further comprising:
a setting unit configured to set the operation timing of each of the reading units in the setting information based on the operation record of the reading unit.

5. The information processing apparatus according to claim 4, wherein the setting unit sets the operation frequency of each of the reading units in the setting information according to the actual reading result of the reading unit.

6. The information processing apparatus according to claim 1, wherein the reading units include a barcode reader configured to read a bar code, a two-dimensional code reader configured to read a two-dimensional code, and a label reader configured to read a service display label.

7. An information processing method, comprising:
acquiring a captured image obtained by capturing a commodity at predetermined acquirement intervals by an image capturing unit in sequence;
reading the information relating to the commodity respectively from the captured image acquired commodity by the acquirement unit;
enabling each reading unit of a plurality of reading units to act in a predetermined order based on setting information in which operation timing of each of the reading units is set; and
outputting the information read by the reading unit,
wherein the setting information is set such that at least two reading units of the reading units start to operate in the predetermined order from a starting point of the predetermined acquirement interval, and the reading unit which is set to be last in the predetermined order of the at least two reading units completes processing of the last reading unit before an end point of the predetermined acquirement interval.

* * * * *